United States Patent [19]
Banks et al.

[11] Patent Number: 5,901,929
[45] Date of Patent: May 11, 1999

[54] CONTROL AND AUGMENTATION OF PASSIVE POROSITY THROUGH TRANSPIRATION CONTROL

[75] Inventors: Daniel W. Banks, Newport News; Richard M. Wood, Virginia Beach; Steven X. S. Bauer, Newport News, all of Va.

[73] Assignee: Administrator, National Aeronautics and Space Administration, Washington, D.C.

[21] Appl. No.: 07/887,002

[22] Filed: May 22, 1992

[51] Int. Cl.$^6$ .................................................. B64C 21/04
[52] U.S. Cl. .................... 244/207; 244/130; 244/75 R; 244/199
[58] Field of Search .................................. 244/204, 207, 244/208, 209, 199, 75 R, 52

[56] References Cited

U.S. PATENT DOCUMENTS

| | | | |
|---|---|---|---|
| 3,794,274 | 2/1974 | Eknes | 244/204 |
| 3,820,628 | 6/1974 | Hanson | 244/208 |
| 3,951,360 | 4/1976 | Anxionnaz | 244/209 |
| 4,392,621 | 7/1983 | Viets | 244/204 |
| 4,522,357 | 6/1985 | Bains et al. | 244/52 |
| 4,522,360 | 6/1985 | Barnwell et al. | 244/204 |
| 4,644,889 | 2/1987 | Krans | 244/209 |
| 4,664,345 | 5/1987 | Lurz | 244/199 |
| 4,726,548 | 2/1988 | Clites | 244/204 |
| 4,991,797 | 2/1991 | Miller et al. | 244/117 A |

*Primary Examiner*—Galen L. Barefoot
*Attorney, Agent, or Firm*—Kimberly A. Chasteen

[57] ABSTRACT

A device for controlling pressure loading of a member caused by a fluid moving past the member or the member moving through a fluid. The device consists of a porous skin mounted over the solid surface of the member and separated from the solid surface by a plenum. Fluid from an area exerting high pressure on the member may enter the plenum through the porous surface and exit into an area exerting a lower pressure on the member, thus controlling pressure loading of the member. A transpirational control device controls the conditions within the plenum thus controlling the side force and yaw moment on the forebody.

1 Claim, 2 Drawing Sheets

CONTROL AND AUGMENTATION OF PASSIVE POROSITY THROUGH TRANSPIRATION CONTROL

ORIGIN OF THE INVENTION

The invention described herein was made by employees of the United States Government and may be used by and for the Government for governmental purposes without the payment of any royalties thereon or therefor.

BACKGROUND OF THE INVENTION

1. Technical Field of the Invention

The present invention relates generally to controlling the pressure load on various members, and more particularly to the active control of pressure loads using porosity.

2. Discussion of the Related Art

Pressure loading of a member can be caused by movement of the fluid and/or the member relative to one another. For example, many portions of an aircraft such as its forebody, canopy, fuselage, wings and tails are subjected to high air loads during flight. These air loads can vary significantly with model attitude and forward flight speed. Of particular concern for high performance military aircraft is that, depending on the geometry of the aircraft and its angle of attack, it may experience a large side force which results in a yawing moment which may be difficult to control. At low angles of attack the flow field is usually symmetric. As the angle of attack increases, two counterrotating, stationary vortices form on the leeward side of the forebody of the aircraft. At higher angles of attack, the vortices become asymmetric creating greater pressure on one side of the aircraft forebody than the other thus resulting in a net side force and yawing moment. If not controlled, the resultant force and moment on the vehicle can be extreme and create an unsafe condition or significantly reduce the flight envelope of the aircraft.

Likewise, many helicopter components such as the tailboom, helicopter body, rotor hub and the rotor itself bear high loads. Land based vehicles such as cars, trucks, vans and especially tractor trailers often encounter huge loads due to inadequate front, top and rear designs. Also buildings, in particular roofs, are exposed to loads from wind conditions which can cause undue strain and even catastrophic failure.

Numerous solutions have been proposed for controlling pressure load which are usually member specific. Initial design of the exterior of the member is an important consideration but is unable to adapt to changing loading conditions. Mechanical devices such as strakes and flaps are often used on vehicles to effectively alter the exterior surface of the vehicular member to achieve a desired reaction to loading. Also various air loading displacement systems are used which suck air from a high pressure area and/or forcibly exit air at a low pressure area to compensate for load induced pressure gradients. These mechanical devices and displacement systems are relatively complicated, have significant energy requirements, add weight to the vehicle, consume often critical space, and are often ineffective over a wide range of angles of attack and lift conditions. Most attempts to reduce air loading on buildings involve initial exterior design as well as flexible internal structure which yields slightly to wind loads.

It is accordingly an object of the present invention to control pressure loading on members.

It is another object of the present invention to control pressure loading over a wide range of member attitude and free stream flow conditions.

It is another object of the present invention to achieve the foregoing objects with a simple control device using minimal energy.

It is a further object of the present invention to achieve the foregoing objects with minimal spatial and mass requirements.

It is yet another object of the present invention to accomplish the foregoing objects in a simple manner.

Additional objects and advantages of the present invention are apparent from the drawings and specification which follow.

SUMMARY OF THE INVENTION

According to the present invention, the foregoing and additional objects are obtained by providing a pressure equalization device for use on a member exposed to a fluid load. This device consists of a porous outer skin, a solid inner surface and a transpirational control device. The porous outer skin is mounted over the solid inner surface with a plenum created between the two such that the fluid may pass through the porous material into the plenum and back through the porous material to equalize the external pressures on the member. The transpirational control device controls the flow through the porous outer skin by regulating the conditions in the cavity beneath this outer skin. Ideally the porous outer skin has a surface porosity of about 10 to 20% and can be made from a porous material or from a solid material which has been perforated. If the latter method is used, the perforations should be no more than about one boundary layer thickness in diameter. The thickness of the porous outer skin should be no less than the diameter of the perforations. The plenum may be divided into smaller, separately controlled plenums, which may be interconnected. The transpirational control device may be a vacuum pump, stored pressure, stored vacuum, or engine bleed air.

DETAILED DESCRIPTION OF THE INVENTION

Figure 1:
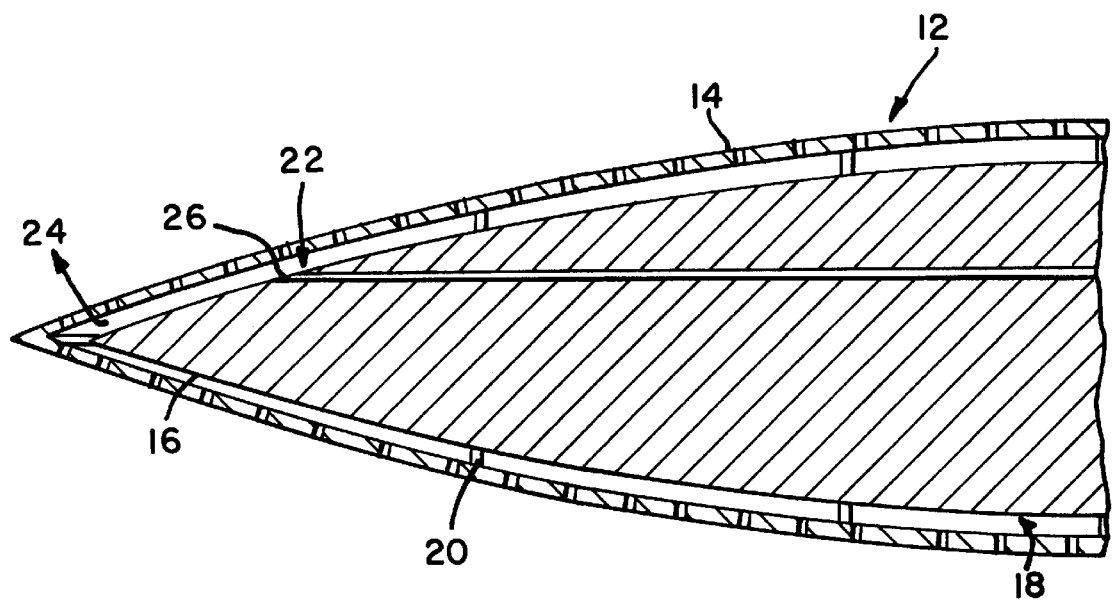
FIG. 1 is a perspective view showing a porous skin mounted outside of a solid surface.

FIG. 1 shows a forebody 12 of an aircraft. A portion of the forebody 12 is covered with a porous skin 14. The required thickness of the porous skin 14 is a function of the pressure load and the required response time for pressure equalization, about one boundary layer thickness. The porosity of the porous skin 14 is optimally between 10 and 20%. The porous skin 14 may be made from a porous material, such as sintered metal, or from a solid material, such as steel or fiberglass, which has been perforated, however these perforations should be no more than about one boundary layer thickness in diameter in order to minimize the disturbance of the external flow field.

Figure 2:
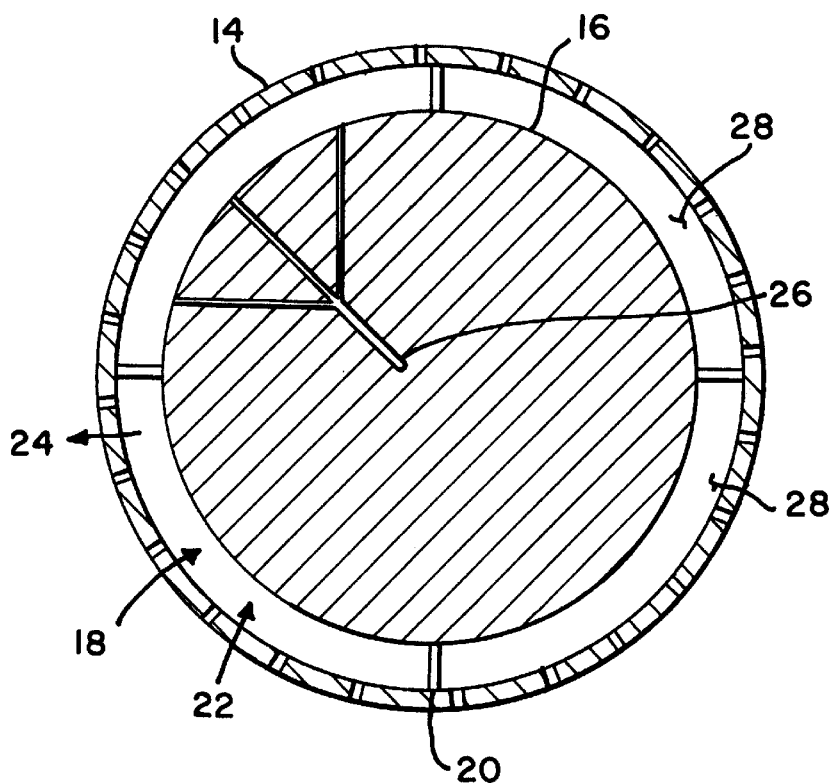
FIG. 2 is a cross sectional view taken along line II—II.

FIG. 2 shows the porous skin 14 mounted outside of the solid surface 16 of the aircraft, forming a plenum 18 between the porous skin 14 and the solid surface 16. The porous skin 14 must be mounted over the plenum 18 such that there is minimal blockage in both the longitudinal and circumferential directions. Plenum 18 may be divided into subplenums 28 to allow for control of smaller areas. These subplenums 28 may be interconnected to other subplenums or may be closed off from the other subplenums by engaging door 20 as needed, see FIG. 2.

Figure 3A:
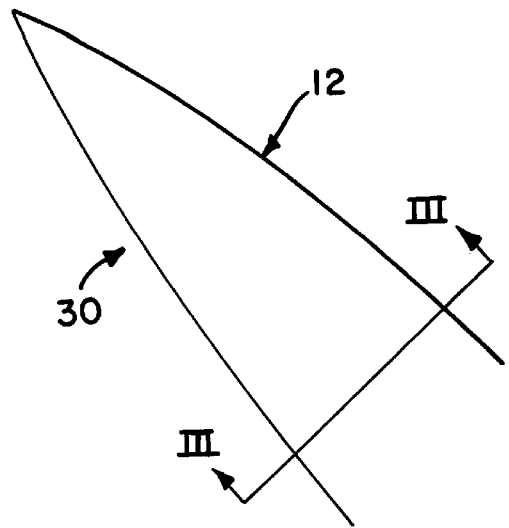
FIG. 3a is a side view of a forebody.
Figure 3B:
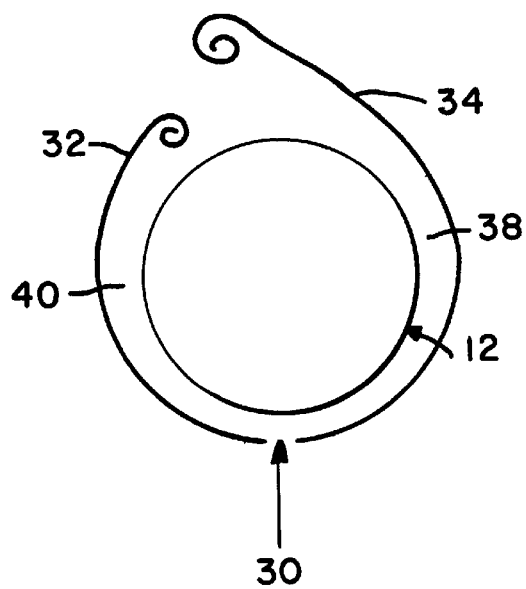
FIG. 3b is a cross-sectional view taken along III—III showing the vortices formed on the forebody without a porous skin.
Figure 4A:
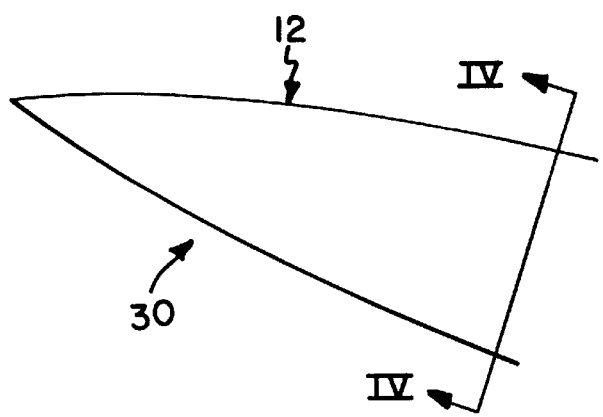
FIG. 4a is a side view of a forebody.
Figure 4B:
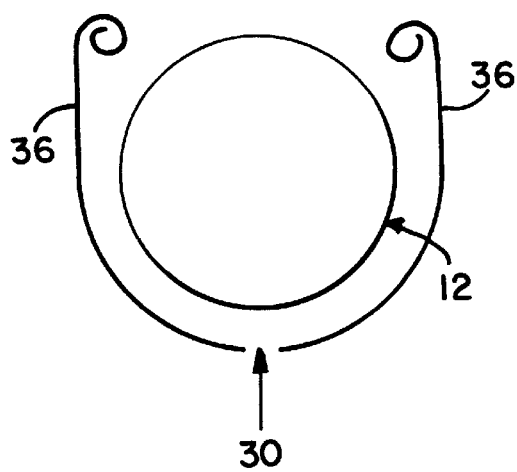
FIG. 4b is a cross-sectional view taken along IV—IV showing the vortices formed on the forebody with a porous skin.

At flight conditions where the fluid flow 30 about a forebody becomes asymmetric (e.g. at high angles of attack) as indicated in FIG. 3 by the asymmetric vortex formation 32 and 34, the pressure field acting on the forebody can become distinctly different from one side to the other. This causes a net side force to act on the forebody and a resultant yawing moment on the vehicle. When the solid surface 16 is covered with a porous skin 14, as described above, air from the lower suction side 38 (highest relative pressure) passes through the porous skin 14 into the plenum 18, flows through the plenum 18, to the higher suction side 40 (lowest relative pressure) thus equalizing the pressure differential and alleviating the side force and yawing moment as shown in FIG. 4. The vortices 36 are symmetric so the pressure fields acting on either side are equal and the net pressure load is zero. The flowfield becomes the same as that around a forebody at low angles of attack.

This invention may also be used to cause unequal pressure fields to improve control of the forebody. Pressure or mass is added or subtracted, as shown by arrows 22 and 24 in FIG. 1, to modify the cavity condition beneath the porous surface 14, thus augmenting or inhibiting the effect of the porous surface 14. The transpirational control device 26 regulates the pressure (and/or mass) inside of the plenum, creating a high or low pressure condition depending on whether a yaw moment to the left or right is required.

This invention may be used to control pressures on any object in a fluid flow including but not limited to aircraft, rotorcraft, cars, trucks, ships, submarines, buildings, pipes and ducts.

What is claimed is:

1. A pressure controlling device for use on a member subject to a pressure load comprising:

a porous outer skin;

a solid inner surface, wherein the porous outer skin is separated from the solid inner surface by a plenum in a manner such that fluid from a high pressure area on the surface of the member enters the plenum through the porous outer skin and exits the plenum through the porous outer skin into a low pressure area on the surface of the member wherein the plenum is divided into smaller, separately controlled plenums, which may be interconnected; and a transpirational control device for controlling flow through the porous outer skin by regulating the conditions in the plenum such that the pressure load on the member is controlled.

* * * * *